United States Patent [19]

Davis

[11] 3,726,988

[45] Apr. 10, 1973

[54] WEATHERPROOF BUS DUCT

[75] Inventor: Russell S. Davis, Spartanburg, S.C.

[73] Assignee: I-T-E Imperial Corporation, Philadelphia, Pa.

[22] Filed: July 17, 1972

[21] Appl. No.: 272,373

[52] U.S. Cl. .......... 174/68 B, 174/99 B, 174/117 FF, 174/120 R
[51] Int. Cl. ................................................ H02g 5/06
[58] Field of Search .................. 174/16 B, 68 B, 70 B, 174/71 B, 72 B, 88 B, 99 B, 99 E, 117 FF, 120 R, 120 RR, 120 SR, 129 B, 133 B; 339/22 B

[56] References Cited

UNITED STATES PATENTS

| 3,187,086 | 6/1965 | Moodie et al. ........................ 174/68 B |
| 3,202,558 | 8/1965 | Gottung et al. ................. 174/120 R X |
| 3,202,756 | 8/1965 | Stanback ............................ 174/99 B |
| 3,584,137 | 6/1971 | Weimer .............................. 174/68 B |
| 3,639,680 | 2/1972 | Dempsey, Jr., et al. ........... 174/117 FF |

Primary Examiner—Laramie E. Askin
Attorney—Sidney G. Faber, et al.

[57] ABSTRACT

A bus duct unit of the type having bus bars stacked in face-to-face relationship, separated from one another and from the metal enclosure by solid insulation only, is constructed for outdoor service by providing a pliable jacket constructed of rubber-like silicone material for the outside of the bus bar stack.

10 Claims, 5 Drawing Figures

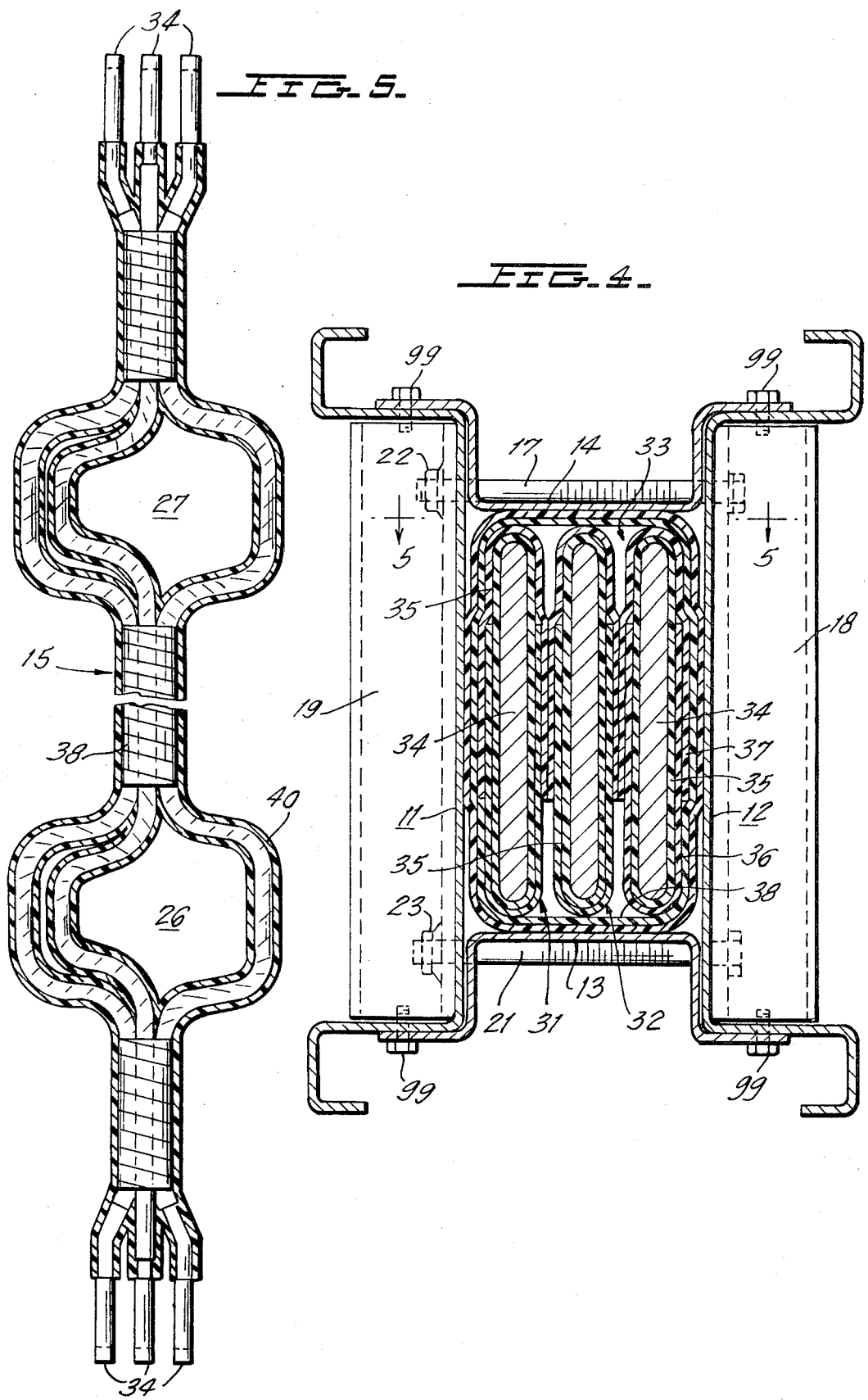

WEATHERPROOF BUS DUCT

This invention relates to bus ducts in general and more particularly relates to bus ducts constructed for outdoor service.

U. S. Pat. No. 3,187,086, issued June 1, 1965 to E. W. Moodie et al. for "Duct with Particular Mounting, Insulation, and Bus Bars" discloses a compact, relatively lightweight bus duct construction including a plurality of bus bars stacked face-to-face and arranged so that air spaces between bus bars are eliminated and air spaces between the faces of the bus bar stack and the walls of the metal enclosure are eliminated. With this construction, good heat conduction from the bus bars to the housing is obtained for improved cooling. Thus, bus bar sizes are reduced and the size of the metal housing is reduced to substantially reduce weight of the bus duct structure.

In order to produce a so-called weather-proof construction of this type for outdoor applications, the basic problem appears to be to protect the insulation of the bus bar stack from weathering, which normally takes place even though the stack is totally enclosed in a steel housing. Some of the insulating materials, and particularly glass filament tape, used in some constructions of this type to secure the insulation covered bus bars together to form a stack, lose their physical properties when subjected to moisture for a long period of time. In addition, water penetration causes ice to form, resulting in breakdown of insulation between adjacent bus bars.

In order to overcome this problem the instant invention provides a pliable insulation jacket for the bus bar stack. This jacket is preferably constructed of a rubber-like silicone sold under the trademark SILASTIC, and is formed by dipping the bus bar stack into a pool of liquid insulation material, moving the stack back and forth in the pool, and then slowly withdrawing the stack from the pool. This process results in the insulation material seeping into all crevices and results in producing a uniform coating over all exterior surfaces of the stack except for the ends of the bus bars in that the latter are masked.

Accordingly, a primary object of the instant invention is to provide a novel construction for a weatherproof bus duct.

Another object is to provide a pliable coating of insulation for a stack of bus bars, with the coating being such that water may not enter between this pliable insulation and the insulating material therebelow.

Still another object is to provide a pliable insulation coating of this type which will not permit tracking in the joint region where the bus bars are exposed.

These objects as well as other objects of this invention will become readily apparent after reading the following description of the accompanying drawings in which.

Figures 1, 2, 3:
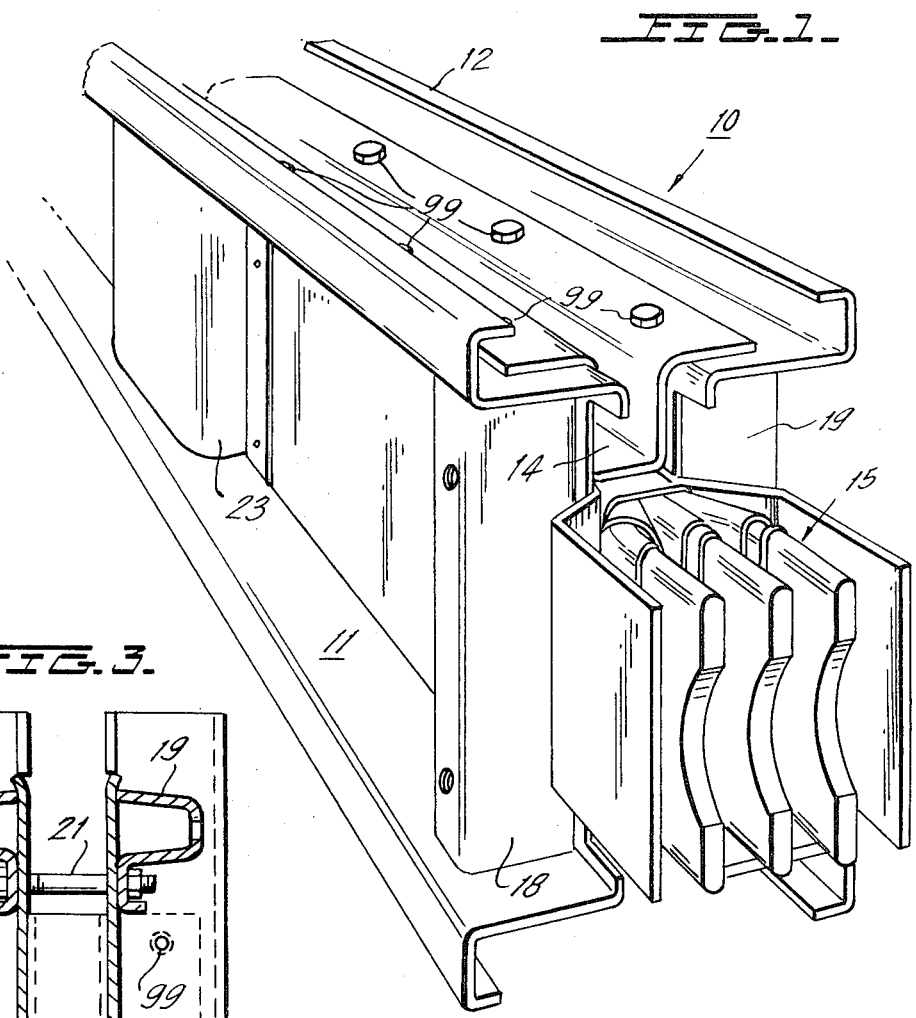
FIG. 1 is a fragmentary perspective showing one end of a bus duct unit constructed in accordance with teachings of the instant invention.
FIG. 2 is a side elevation of the bus duct unit of FIG. 1.

FIGS. 3 and 4 are cross sections taken through the respective lines 3—3 and 4—4 of FIG. 2, looking in the direction of the respective sets of arrows 3—3 and 4—4.

FIG. 5 is a plan view of the bus bar stack, looking in the direction of arrows 5—5 of FIG. 4, with the near surface of the pliable insulating jacket removed.

Now referring to the figures. Bus duct unit 10 includes a housing constructed of elongated channel-like steel members 11-14 secured together by stub sheet metal screws 99. Elongated bus bar stack 15 is disposed within housing 11-14, with the ends of stack 15 extending beyond the ends of housing 11-14 for electrical connection to the bus bars of adjacent bus duct units (not shown) by the bridging elements in joint stacks of a type disclosed in U. S. Pat. No. 3,339,009, issued Aug. 29, 1967 to R. S. Davis et al. for "Bus Duct With Removable Joint Stack." At each end of housing 11-14 an upper clamping screw 17 extends through housing members 11, 12, 14 and through outboard legs of formed clamping bars 18, 19 adjacent to the outer surfaces of housing walls 11, 12 respectively. At each of these same locations lower clamping screws 21 extends through housing members 11, 12, 13 and the outboard legs of clamping members 18, 19. Tightening of nuts 22, 23, threadedly mounted to screws 17, 21, respectively, draws housing parts 11, 12 into firm engagement with the faces of bus bar stack 15. Bulging plates 23 on both sides of housing 11-14 cover apertures provided in housing members 11, 12 for expansion loops in regions 26, 27 of bus bar stack 15, and are secured by additional bolts 17, 21 and nuts 22, 23.

Bus bar stack 15 is constructed of three bus bar units 31, 32, 33, stacked in abutting face-to-face relationship for the entire lengths thereof except at expansion loop regions 26, 27. Each bus bar stack 31-33 includes elongated bus bar 34 having inner insulating jacket 35, preferably constructed of polyvinyl chloride, deposited thereon. Outer insulating jacket immediately over insulating jacket 35 is constructed of longitudinally extending and overlapping sheet 36, 37 of polyester film.

Bus bar units 31, 32, 33 are secured together to form an assembly by utilizing a spiral wrapping of polyester backed glass filament insulating tape to form another insulating jacket 38. It is noted that in expansion loop regions 26, 27, bus bar units 31-33 are individually wound, and in the regions where these units 31-33 abut one another, a single winding of tape overlaps all three units 31-33. The outer insulating jacket 40, applied directly over wrapping 38, is formed by dipping the assembly of bus bar units 31-33, held together by wrapping 38, into a pool of liquid SILASTIC; moving this assembly back and forth in the pool; and thereafter slowly withdrawing this assembly from the pool. These steps result in the formation of a uniform pliable insulating jacket 40 constituting the outside layer of stack 50. It is noted that pliable insulating jacket 40 is not formed at the ends of bus bars 34, since these areas are masked prior to dipping into the pool of liquid SILASTIC, so that the bus bar ends may be used for splicing purposes.

For a bus bar 0.250 inch thick, PVC jacket 35 is typically 0.020 to 0.025 inch thick, polyester films 36, 37 are each typically 0.003 inch thick, the tape forming jacket 38 is typically 0.007 inch thick, and the pliable outer jacket 40 is typically 0.015 to 0.030 inch thick. It is noted that in FIG. 4 shapes of the insulating elements are shown prior to tightening of clamping screws 17, 21. Upon tightening of screws 17, 21 the insulation jackets deform slightly as required to eliminate those air spaces which are shown as resulting from the overlapping of films 36, 37 and partial overlapping of the tape layers forming jacket 38. It is noted that even though the instant invention has been described herein in connection with a three bus bar stack 15, it should now be apparent that teachings of the instant invention apply equally to stacks having four or more bus bars.

Although there has been described a preferred embodiment of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows:

1. A bus duct unit including an elongated metal housing and an elongated stack of bus bars disposed within said housing in heat transferring contact therewith; said stack including a plurality of elongated generally flat bus bar units stacked in abutting face-to-face relationship; each of said bus bar units including a generally flat bus bar having an insulation means covering in contact therewith; said stack also including a first insulating jacket holding said plurality of bus bar units together as an assembly, and a second insulating jacket overlying said first insulating jacket; said second insulating jacket being constructed of pliable material.

2. A bus duct unit as set forth in claim 1 in which the pliable material possesses dielectric and weather-resisting properties of a rubberlike silicone.

3. A bus duct unit as set forth in claim 2 in which the first insulating jacket comprises a winding of insulating tape.

4. A bus duct unit as set forth in claim 2 in which the insulation means includes a third insulating jacket in contact with said bus bar and a fourth insulating jacket outside of said third insulating jacket; said fourth insulating jacket being constructed of overlapping elongated sheets whose edges extend parallel to the longitudinal axis of the bus duct unit.

5. A bus duct as set forth in claim 4 in which the third insulating jacket comprises a single layer of substantially uniform thickness throughout.

6. A bus duct unit as set forth in claim 5 in which the third insulating jacket is constructed of PVC.

7. A bus duct unit as set forth in claim 6 in which the first insulating jacket comprises a winding of insulating tape.

8. A bus duct unit as set forth in claim 7 in which the stack includes at least one expansion loop.

9. A bus duct unit as set forth in claim 1 in which the stack includes at least one expansion loop.

10. A bus duct unit as set forth in claim 1 in which the insulation means and both of the insulating jackets terminate short of both ends of said stack, whereat uninsulated joint forming parts of the bus bars are found.

* * * * *